United States Patent [19]

Churchill

[11] Patent Number: 5,109,461

[45] Date of Patent: Apr. 28, 1992

[54] FIBER OPTICS LIGHT DEVICE

[76] Inventor: David L. Churchill, 2200 Rte. 301, Unit 5, Palmetto, Fla. 34221

[21] Appl. No.: 698,615

[22] Filed: May 10, 1991

[51] Int. Cl.$^5$ .............................................. G02B 6/04
[52] U.S. Cl. ...................................... 385/115; 362/32; 385/901
[58] Field of Search ............... 350/96.24, 96.25, 96.26, 350/96.1; 362/32, 33

[56] References Cited

U.S. PATENT DOCUMENTS 3,621,390  11/1991  Willisen ............................ 350/96.24
4,797,736  1/1989  Kloots et al. ........................ 362/33

Primary Examiner—Frank Gonzalez
Assistant Examiner—John Ngo
Attorney, Agent, or Firm—Charles J. Prescott

[57] ABSTRACT

A fiber optics light device particularly adapted for use in illuminating an object in conjunction with an optical comparitor. The device, which transmits light to the object from a separate light source, has a generally U-shaped housing having a first pair of flexible conduits, each one of the pair connected at one end and laterally extending in the same direction from each one of the arms of the housing. A second pair of flexible conduits is connected at one end and laterally extend from the cross-member of the housing. Optical fibers extend between the distal ends of the corresponding first and second pair of conduits and through the corresponding housing arms transmitting light therethrough. The distal ends of the first conduits emit light against the object and are adjustably positionable for that purpose.

8 Claims, 3 Drawing Sheets

FIBER OPTICS LIGHT DEVICE

BACKGROUND OF THE INVENTION

This invention relates generally to fiber optic devices used in illuminating systems, and more particularly to a fiber optic device for use in illuminating an object placed for inspection upon the table or working surface of an optical comparitor.

Optical comparitors are well-known and utilized in industry for examining and magnifying the profiles of various objects to determine accuracy of machining, etc. Two light sources are presently incorporated into such comparitors. The first light source is from a conventional external light source for illuminating the object as it rests atop the inspection table. Separately, an internal profile projection lamp, typically either in the form of a tungsten halogen bulb or a mercury arc, is utilized to project the object profile onto the viewing screen.

However, it has been determined that the available exterior illumination for the object itself, and the direction and angle from which it emanates may be somewhat inadequate in that a more focused and intense form of lighting is necessary to fully utilize the capacity of these optical comparitors.

A number of optical illumination devices are known to applicant as follows:

| | |
|---|---|
| Churchill | 5,000,535 |
| Seitz et al. | 3,360,640 |
| Seitz et al. | 3,437,803 |
| Sitter et al. | 3,446,952 |
| Batson et al. | 3,532,873 |
| Bauerkemper | 4,061,522 |
| Desmaret | 4,407,012 |
| Heitman et al. | 4,613,926 |
| Mori | 4,726,642 |
| VonKohorn et al. | 4,729,069 |
| Chiu | 4,729,070 |
| Sadamune et al. | 4,887,190 |

However, none of these optical lighting devices are suited for the purpose of the present invention.

The present invention provides an additional means of illuminating the object placed upon the working surface or table of optical comparitors so as to enhance the performance of those comparitors.

BRIEF SUMMARY OF THE INVENTION

This invention is directed to a fiber optics light device particularly adapted for use in illuminating an object in conjunction with an optical comparitor. The device, which transmits light to the object from a separate light source, has a generally U-shaped housing having a first pair of flexible conduits, each one of the pair connected at one end and laterally extending in the same direction from each one of the arms of the housing. A second pair of flexible conduits is connected at one end and laterally extend from the cross-member of the housing. Optical fibers extend between the distal ends of the corresponding first and second pair of conduits and through the corresponding housing arms transmitting light therethrough. The distal ends of the first conduits emit light against the object and are adjustably positionable for that purpose.

It is therefore an object of this invention to provide an illuminating device for objects placed atop the working surface of an optical comparitor.

It is another object of this invention to provide a supplemental, focused light source for illuminating the object placed atop the table of an optical comparitor.

It is yet another object to provide the above invention to be readily adaptable to existing optical comparitors.

It is yet another object of this invention to provide a positionally adjustable light source for illuminating objects on the working surface of an optical comparitor.

In accordance with these and other objects which will become apparent hereinafter, the instant invention will now be described with reference to the accompanying drawings.

DETAILED DESCRIPTION OF THE INVENTION

Figure 1:
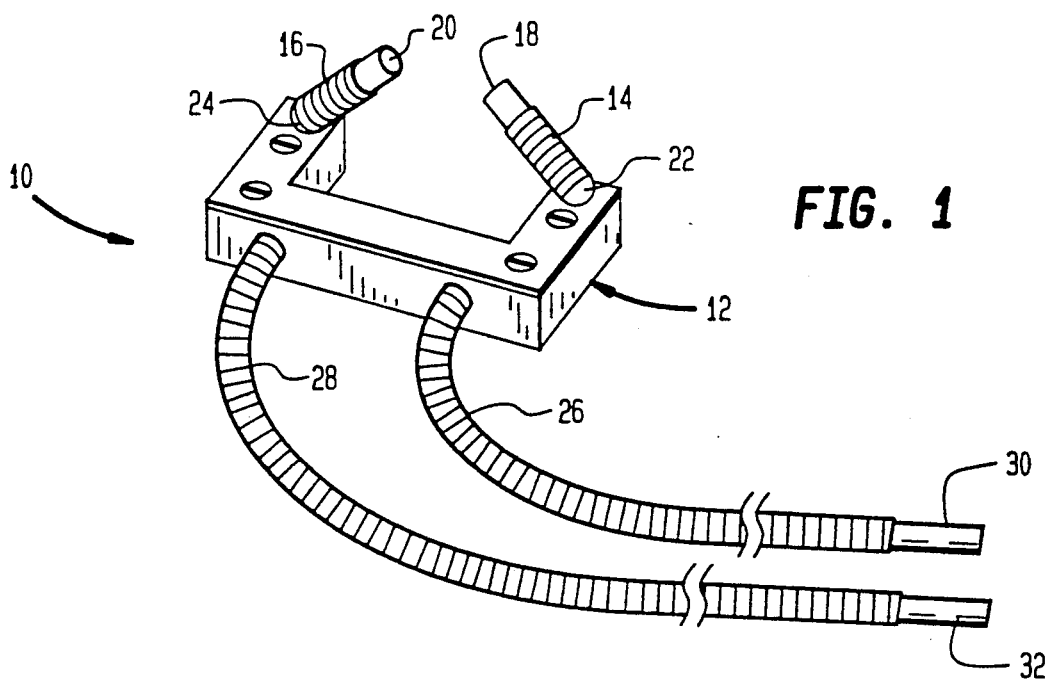
FIG. 1 is a perspective view of the invention.
Figure 2:
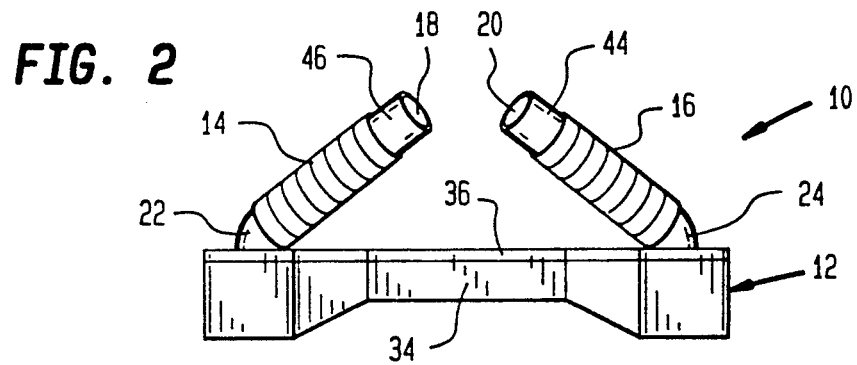
FIG. 2 is a top elevation perspective view of FIG. 1.
Figure 3:
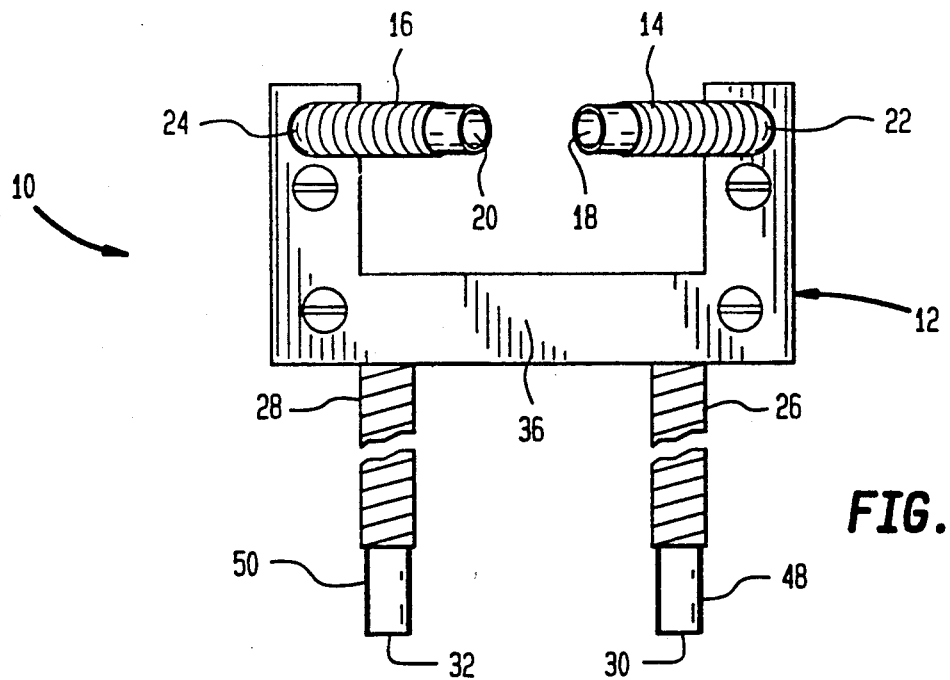
FIG. 3 is a top plan view of FIG. 1.

Referring now to the drawings, and particularly to FIGS. 1 to 4, the invention is shown generally at numeral 10 and includes a hollow housing 12 which is configured generally in a U-shape or horseshoe shape. The housing 12 includes a lower molded thin-wall member 34 integrally cast formed using EMERSON-CUMMINGS STYCAST #2058 Casting epoxy. The cover 36 is preferably fabricated of flat aluminum stock.

Figure 4:
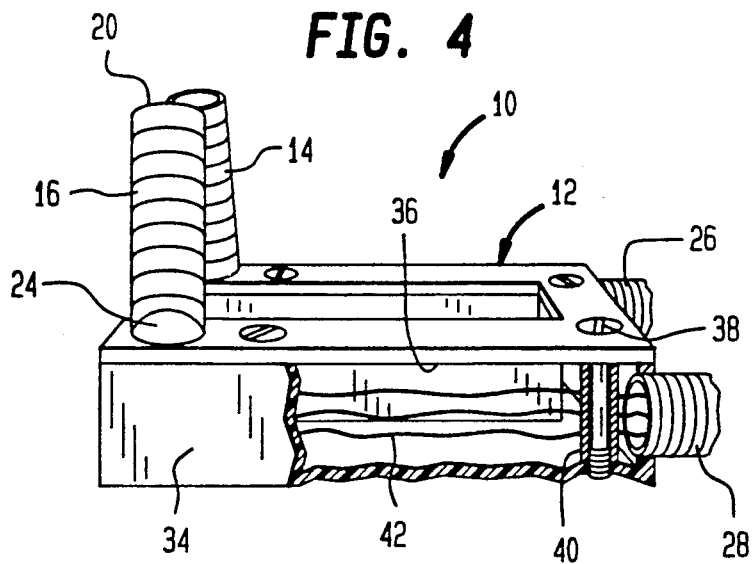
FIG. 4 is a side elevation partially broken perspective view of FIG. 1.

As best seen in FIG. 4, the lower member 34 and the cover 36 are held together by fasteners 38 within spacers 40, the fasteners 38 being threadably engaged into the bottom surface of lower member 34.

The device 10 also includes a pair of shorter, flexible conduits 14 and 16 which are connected at one end to mounting collars 22 and 24 positioned of the upper surface of housing 12 near the distal ends of the arms of the U-shape of housing 12. These conduits 14 and 16 are inwardly angled toward one another by collars 22 and 24 in equal amounts to form a combined angle therebetween of approximately 104 degrees or generally in the range of 90 to 110 degrees. However, because of the flexibility of conduits 14 and 16, adjustments in the light output direction may be varied.

An additional pair of elongated flexible conduits 26 and 28 are connected at one end to the side wall surface of the transverse or cross member 36 of the U-shape of housing 12. These conduits 26 and 28 are of sufficient length to extend to have their distal ends 30 and 32 positioned in close proximity to a light source.

Threaded through conduits 14 and 16, through the hollow interior of the arms of housing 12 and through flexible conduits 26 and 28 are two separate bundles of optical fibers 42. These bundles of these optical fibers extend from their distal ends 18 and 20, respectively, to the distal end 30 and 32 respectively of conduits 26 and 28. These fibers are coated with METHACRYLIC adhesive and cured with ultra violet light. The excess fiber protruding from end collars 44, 46, 48 and 50 is cut off and the tips 18, 20, 30, and 32 are then ground and polished in three steps. The first step uses a 320 mesh grit moistened with a solution of water and CIMSTAR 40. The second step uses 600 mesh grit dry. The final step employs a pelhim pad with alumina oxide moistened with CIMSTAR 40.

Figure 6:
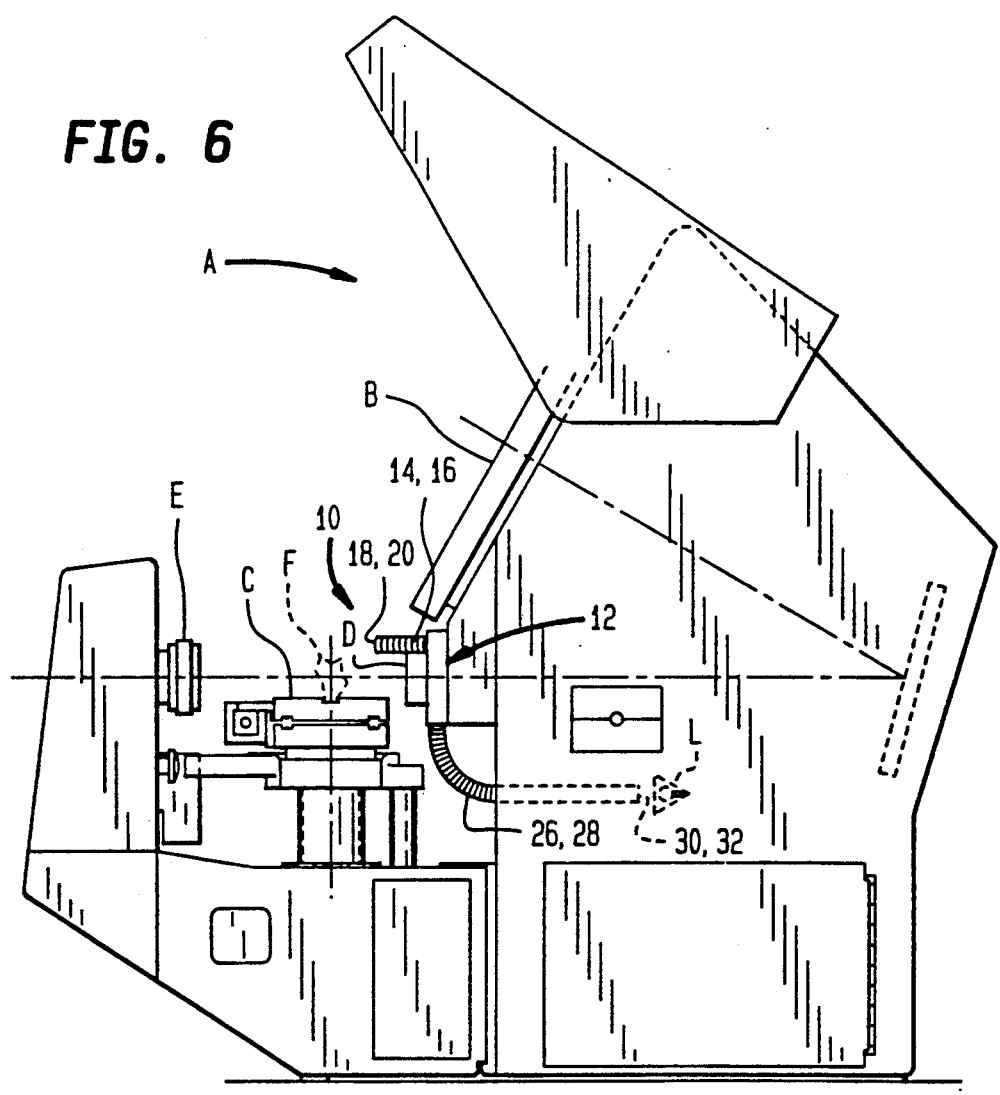
FIG. 6 is a side elevation view of FIG. 5.
Figure 5:
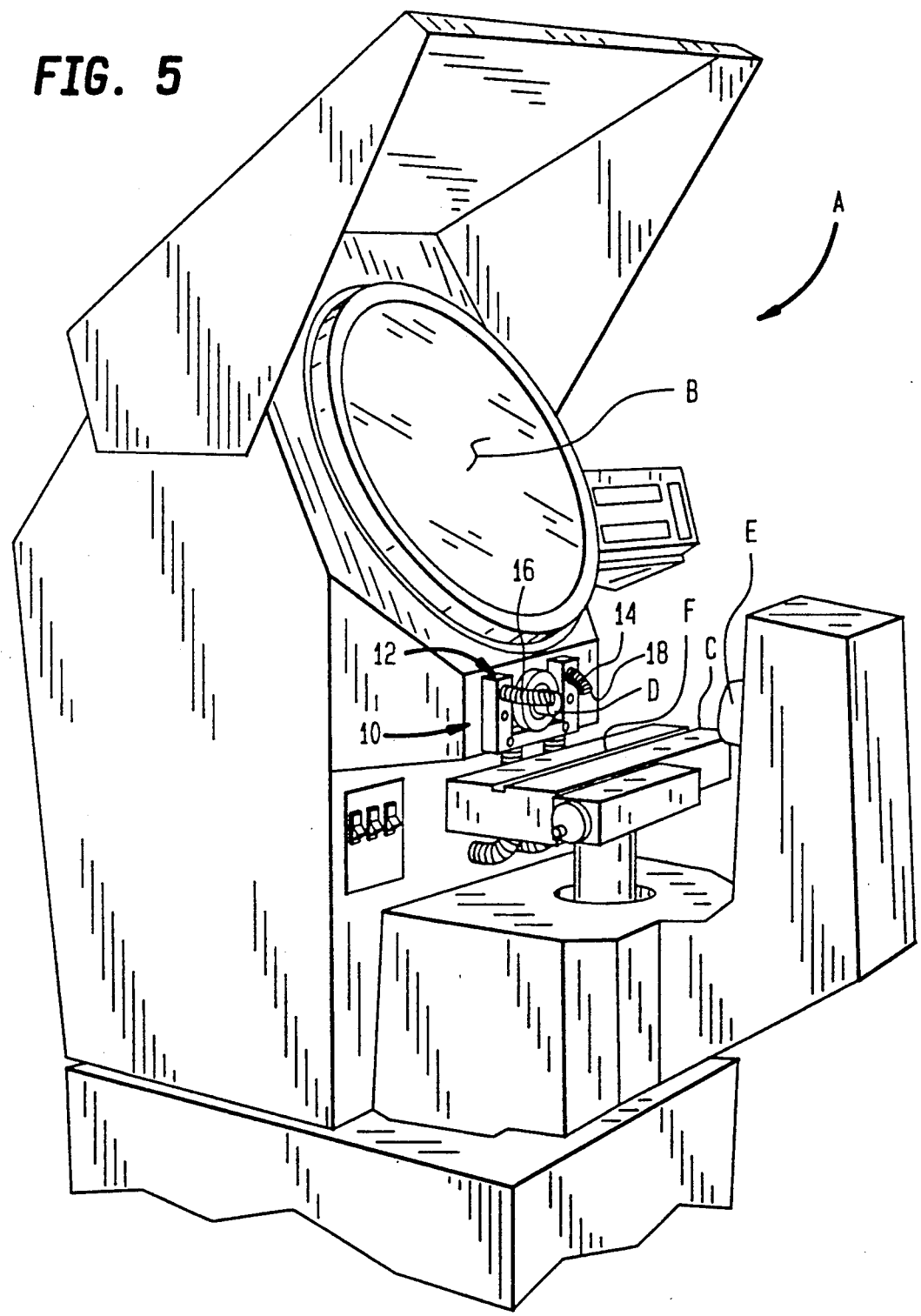
FIG. 5 is a perspective view of an optical comparitor with the invention installed therein.

In use, referring additionally to FIGS. 5 and 6, the device 10 is connected beneath the viewing screen B of an optical comparitor A. The U-shaped housing 12 is structured to fit beneath and along side the viewing lens D. The optical comparitor A normally includes a light source for illuminating the object F placed atop working surface C emanating from lens E.

The distal ends 30 and 32 are allowed to be positioned by conduits 26 and 28 immediately adjacent an additional light source L of approximately 300 watts. The optical fibers 42 contained within the device then transmit the light for emanation from the distal ends 18 and 20 of flexible conduit 14 and 16 onto object F.

Because of the flexibility of conduit 14 and 16, the light projected against object F may be easily adjusted and repositioned as desired for optimal enhanced viewing of the object F onto viewing screen B.

Although not preferred, the housing 12 may be molded as solid epoxy or the like with the optical fibers within the arms cast molded therewithin.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A fiber optics light device for illuminating from a separate light source an object for viewing on a viewing screen of an optical comparitor comprising:
   a generally U-shaped hollow housing including a cover, bottom wall, and side walls forming a pair of spaced elongated arms extending in generally parallel fashion from either end of a cross member;
   a first pair of flexible conduits each having a first end secured adjacent a distal end of each said arm and laterally extending in the same direction therefrom;
   a second pair of flexible conduits each having a first end secured to said cross member and laterally extending therefrom in an opposite direction from said arms;
   an optical fiber bundle extending through each said arm and having a first end fixedly secured in a distal second end of each flexible conduit of said first pair of flexible conduits;
   each said optical fiber bundle also having a second end fixedly secured in a distal second end of each flexible conduit of said second pair of flexible conduits.

2. A fiber optics light device as set forth in claim 1, wherein:
   said first ends of each of said first pair of flexible conduits secured in said cover;
   said first ends of each of said second pair of flexible conduits secured in an outer said side wall of said cross member.

3. A fiber optics light device as set forth in claim 2, wherein:
   said side walls and said bottom are integrally molded and include an end wall forming each said arm distal end.

4. A fiber optics light device as set forth in claim 1, wherein:
   said first pair of conduits are generally inwardly oriented toward one another.

5. A fiber optics light device for illuminating from a separate light source an object for viewing on a viewing screen of an optical comparitor comprising:
   a generally U-shaped integrally molded housing having a top surface, side walls and a bottom surface forming a pair of elongated generally parallel arms extending from a cross member;
   a first pair of flexible conduits each having a first end secured adjacent a distal end of each said arm and laterally extending in the same direction therefrom;
   a second pair of flexible conduits each having a first end secured to said cross member and laterally extending in the same direction therefrom;
   an optical fiber bundle extending through each said arm and having a first end fixedly secured in a distal second end of each flexible conduit of said first pair of flexible conduits;
   each said optical fiber bundle also having a second end fixedly secured in a distal second end of each flexible conduit of said second pair of flexible conduits.

6. A fiber optics light device as set forth in claim 5, wherein: said first ends of each of said first pair of flexible conduits secured in said top surface;
   said first ends of each of said second pair of flexible conduits secured in an outer said side wall of said cross member.

7. A fiber optics light device as set forth in claim 6, wherein:
   said first pair of conduits generally inwardly oriented toward one another.

8. A fiber optics light device as set forth in claim 7, wherein:
   said first pair of conduits forming an angle of about 90 to 110 degrees between each flexible conduit of said first pair of conduits.

* * * * *